United States Patent
Lane et al.

(10) Patent No.: US 8,890,143 B2
(45) Date of Patent: Nov. 18, 2014

(54) METHOD TO OPTIMIZE AND REDUCE INTEGRATED CIRCUIT, PACKAGE DESIGN, AND VERIFICATION CYCLE TIME

(75) Inventors: Ryan D. Lane, San Diego, CA (US); Ruey Kae Zang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 362 days.

(21) Appl. No.: 12/887,556

(22) Filed: Sep. 22, 2010

(65) Prior Publication Data

US 2012/0068175 A1    Mar. 22, 2012

(51) Int. Cl.
*H01L 23/58* (2006.01)
*G06F 17/50* (2006.01)

(52) U.S. Cl.
CPC ..... *G06F 17/5068* (2013.01); *H01L 2924/1532* (2013.01); *G06F 2217/40* (2013.01)
USPC .................. 257/48; 438/11; 438/14; 438/15; 438/18

(58) Field of Classification Search
CPC ................................................ H01L 2924/1532
USPC ......................................................... 257/48
See application file for complete search history.

(56) References Cited

U.S. PATENT DOCUMENTS

| | | | |
|---|---|---|---|
| 6,731,009 B1 * | 5/2004 | Jones et al. | 257/777 |
| 6,748,103 B2 | 6/2004 | Glasser et al. | |
| 6,961,918 B2 | 11/2005 | Garner et al. | |
| 7,299,446 B2 | 11/2007 | He et al. | |
| 7,400,134 B2 | 7/2008 | Morishita et al. | |
| 7,469,401 B2 | 12/2008 | Bhattacharya et al. | |
| 2002/0004288 A1 * | 1/2002 | Nishiyama | 438/464 |
| 2002/0079591 A1 | 6/2002 | Sakiyama et al. | |
| 2007/0200236 A1 | 8/2007 | Ishiyama | |
| 2009/0132987 A1 | 5/2009 | Huynh et al. | |
| 2009/0231474 A1 * | 9/2009 | Ludwig | 348/252 |

FOREIGN PATENT DOCUMENTS

| | | | |
|---|---|---|---|
| JP | 2002190568 A | 7/2002 | |
| JP | 2007227883 A | 9/2007 | |

\* cited by examiner

*Primary Examiner* — Ajay K Arora
(74) *Attorney, Agent, or Firm* — Donald D. Min (57) ABSTRACT

A method for fabricating an integrated circuit (IC) product and IC product formed thereby. The method includes designing an IC package having a plurality of IC connection sets, each configured to be connected to a corresponding IC selected from among a plurality of ICs, each having different functionality. Various IC products can be produced depending upon which selected IC is connected to its corresponding connection set, and the IC package can be cut during design to exclude IC connection sets corresponding to ICs that are not selected. By testing the complete IC package, a portion of the complete IC package can be fabricated, cut from the complete IC package, with significantly reduced design and testing requirements.

27 Claims, 9 Drawing Sheets

METHOD TO OPTIMIZE AND REDUCE INTEGRATED CIRCUIT, PACKAGE DESIGN, AND VERIFICATION CYCLE TIME

FIELD

This various embodiments described herein relate in general to improvements in integrated circuit packaging, and, more specifically, to methods and apparatus for configuring integrated circuit chips in multiple packages that can be regarded as different products.

BACKGROUND

The design of integrated circuits (IC) products involves difficult and complex processes. For example, IC customers may request an IC product that has certain functionalities that may be fulfilled with one or more pre-existing packaged ICs. In this scenario, sometimes new or "combo" IC packages are designed in or on which the pre-existing IC packages are combined and interconnected. The new IC packages, in turn, are delivered to the customer to be connected in the customer's particular application. The overall goal for package designers is to deliver IC packages having a variety of circuit functionalities quickly, efficiently, and as economically as possible.

Meeting these goals, however, poses many problems for package designers. Although computer aided design tools are widely available, the package design process is still very complex. The process typically involves designing a package to which the pre-existing ICs can be mounted, with interconnects arranged so that a package can be delivered to the customer to meet his own fabrication needs. In order to do this, the package must be tested with the pre-existing IC packages in place, a process in itself which takes a considerable amount of time. Each product must be individually designed, fabricated, and tested. However, if a customer (or another customer) desires a related product, it must be individually designed from scratch, again requiring time and resources to build. This can often be frustrating for the customer.

Oftentimes, multiple pre-existing IC packages are connected in a single package; however, if it is desired to divide the product into multiple packages, each package needs to be regarded as a new product. This again requires a new package design to be completed from scratch. Additionally, even though a portion of the product existed in the old design, the new product needs to be evaluated and tested to guarantee its performance in the new package. This traditional approach requires each package to be simulated and custom designed to meet the electrical requirement and substrate manufacture process, which can take twelve months or more to complete. To support an integrated circuit chip being used in two different products, either the resources needed to be doubled, or the development cycle time made longer.

What is needed is a method and apparatus to save design and verification cycle time in integrated circuit and integrated circuit package design.

SUMMARY

According to a broad embodiment, a method is disclosed to optimize and reduce integrated circuit, package design, and verification cycle time for multi-die product and its derived product from multi-die package into single die or any combination of the dice into package.

Thus, according to broad embodiments of the invention, the integrated circuit and package design and routing can be reused and applied to multiple products that may use the integrated circuit being developed.

An embodiment of a method for fabricating an integrated circuit product includes designing an integrated circuit package having a plurality of integrated circuit connection sets. Each of the integrated circuit connection sets are configured to be connected to a corresponding integrated circuit selected from among a plurality of integrated circuits. Different integrated circuit products can be produced depending upon which selected integrated circuit is connected to its corresponding connection set, and the integrated circuit package can be cut to exclude integrated circuit connection sets corresponding to integrated circuits that are not selected. The method also includes connecting at least one of the selected integrated circuits on at least one of the corresponding integrated circuit connection sets to selectively form the integrated circuit product.

In performing the method, the plurality of integrated circuits are connected to a corresponding integrated circuit connection set, and the resulting integrated circuit package is tested. Subsequently, if an integrated circuit product is desired to be fabricated having a function that is a subset of the function provided by the resulting integrated circuit package, the resulting integrated circuit package is cut during a design phase to include only the portions necessary to perform the desired function, and the integrated circuit that performs the desired subset function connected.

Another embodiment of a method for fabricating an integrated circuit product includes fabricating a first integrated circuit package having a plurality of integrated circuit connection sets. Each of the integrated circuit connection sets are configured to be connected to a corresponding integrated circuit selected from among a plurality of integrated circuits. The corresponding integrated circuits of the plurality of integrated circuits are connected to the integrated circuit connection sets to form a complete integrated circuit package and the complete integrated circuit package is tested. Thereafter, a second integrated circuit package is designed based on the first integrated circuit package, the second integrated circuit package including less than all of the corresponding integrated circuits of the plurality of integrated circuits to form the integrated circuit product. During the design of the second integrated circuit package, the complete integrated circuit package may be cut to form the second integrated circuit package.

An embodiment of an integrated circuit (IC) product includes a package containing an IC chip having IC chip contacts and a substrate having a plurality of substrate contacts. A plurality of IC interconnects carried by the substrate are connected to the IC chip contacts and to the substrate contacts. The IC product is cut during its design as a subset of a fully tested IC package which included the IC product and at least one other IC product.

An embodiment of an article of manufacture includes a substrate and a plurality of integrated circuit connection sets. Each of the sets of the integrated circuit connection sets are independently configured to enable a corresponding integrated circuit to be selectively connected thereto. Thus, different integrated circuit products can be produced depending upon which corresponding integrated circuit is selected and connected.

BRIEF DESCRIPTION OF THE DRAWINGS

FIG. 2b is a cut-away top view, taken at 2b-2b in FIG. 3b, of one of the integrated circuit products that can be formed by cutting the complete integrated circuit package of FIG. 2a.

FIG. 3a is a cut-away side view of the complete integrated circuit package (which may also be an integrated circuit product) taken at 3a-3a in FIG. 2a.

FIG. 4b is a cut-away top view, taken at 4b-4b in FIG. 5b, of one of the integrated circuit products that can be formed by cutting the complete integrated circuit package of FIG. 4a.

FIG. 5a is a cut-away side view of the complete integrated circuit package (which may also be an integrated circuit product) taken at 5a-5a in FIG. 4a.

In the various figures of the drawing, like reference numbers are used to denote like or similar parts.

DETAILED DESCRIPTION

Figure 1:
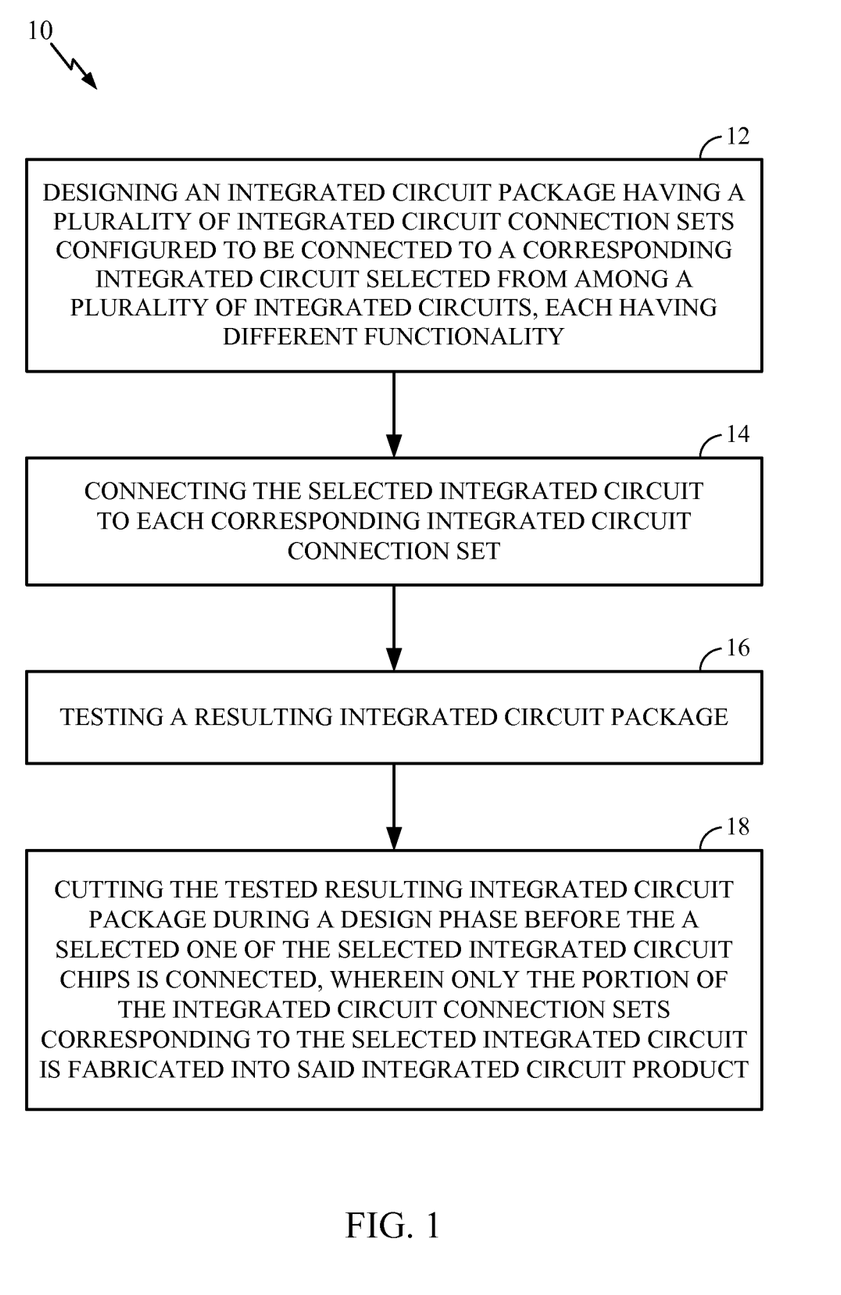
FIG. 1 is a flow diagram showing an illustrative embodiment of a method for fabricating an integrated circuit package.

An embodiment of a method by which integrated circuit products may be designed and fabricated is illustrated in the flow diagram 10 of FIG. 1, to which reference is now made. As shown in box 12, an integrated circuit package having a plurality of integrated circuit connection sets is designed. A connection set example is described in greater detail below in conjunction with FIGS. 4-6. Each of the integrated circuit connection sets is configured to be connected to a corresponding integrated circuit selected from among a plurality of integrated circuits, each having different functionality, to enable different integrated circuit products to be produced depending upon which selected integrated circuit is connected to its corresponding connection set.

The connection sets may be, for example, metallization traces or patterns, formed in well-known manner. The metallization patterns, however, are formed in a manner such that they can be cut or separated during a design phase to enable the functionalities of the selected integrated circuits to be separated, if desired, and still perform according to the product specifications.

As shown in box 14, after the package substrate has been formed with the various connection sets, each of the selected integrated circuits are connected to its corresponding integrated circuit connection set to form a complete integrated circuit package. As shown in box 16, the resulting complete integrated circuit package is then tested. The resulting complete integrated circuit package, containing the various selected integrated circuit packages, at this point, comprises a complete integrated circuit product in and of itself, and can be delivered to those customers desiring the functionality provided thereby.

However, often customers want only a subset of the complete integrated circuit package; for example, a customer may need the functionality of only one of the selected integrated circuits contained on the complete integrated circuit package. Thus, as shown in box 18, the integrated circuit package can be cut to exclude integrated circuit connection sets corresponding to integrated circuits that are not selected.

Thus, since the complete integrated circuit package has been fully tested, for the design of a package having a subset of the complete integrated circuit package, the complete circuit package is cut during the design phase of the subset package, using the particular computer design tool used. Then, the selected integrated circuit is connected to its corresponding integrated circuit connection set to selectively form said integrated circuit product. Since the complete integrated circuit package has been fully tested, as mentioned, the new integrated circuit product needs little, if any additional testing. Thus, the overall design time of the subset product is substantially reduced.

Figure 2A:
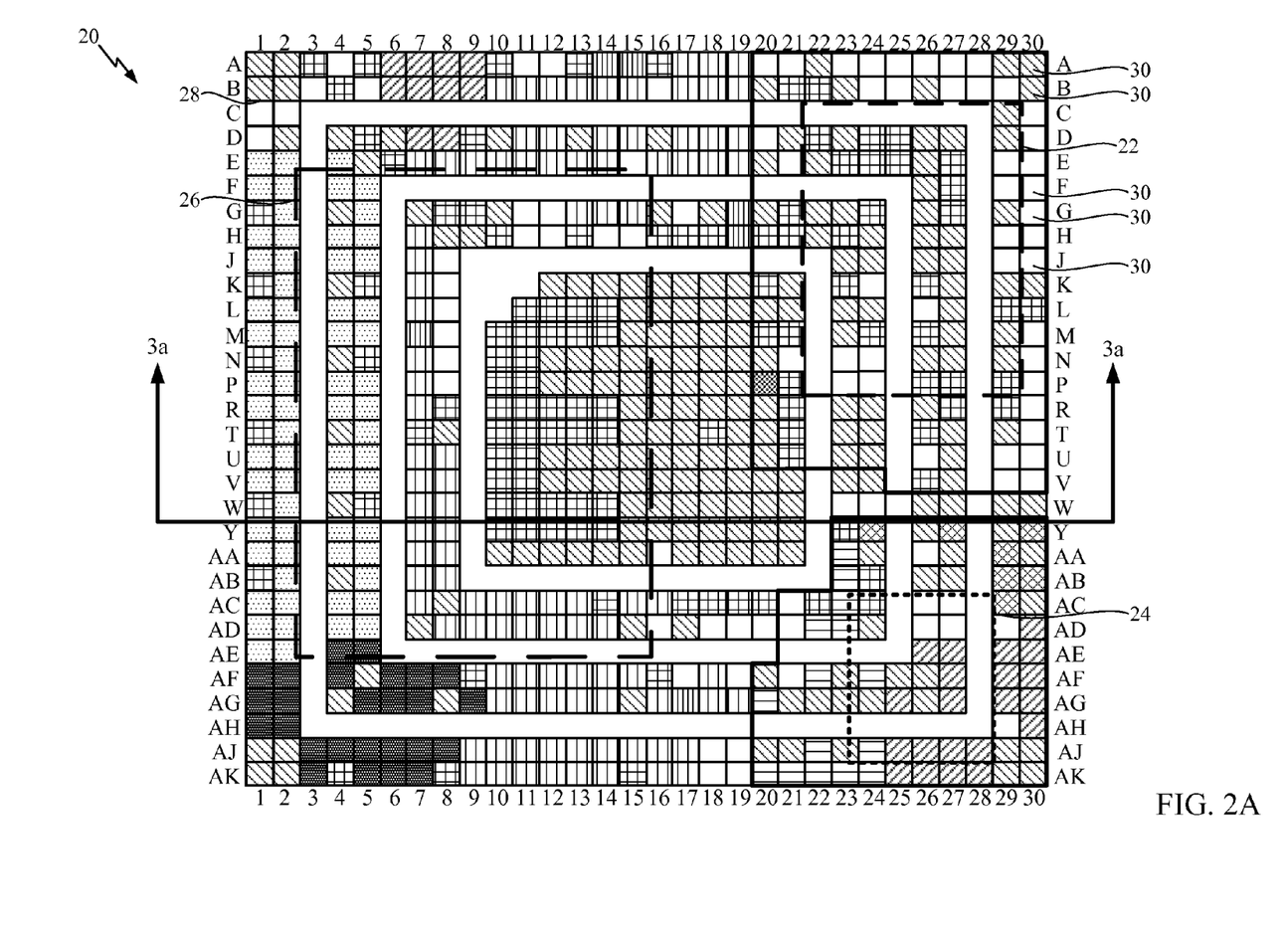
FIG. 2a is a cut-away top view of an illustrative complete integrated circuit package, taken at 2a-2a in FIG. 3a, containing a number of integrated circuits from which a plurality of integrated circuit products can be formed.
Figure 2B:
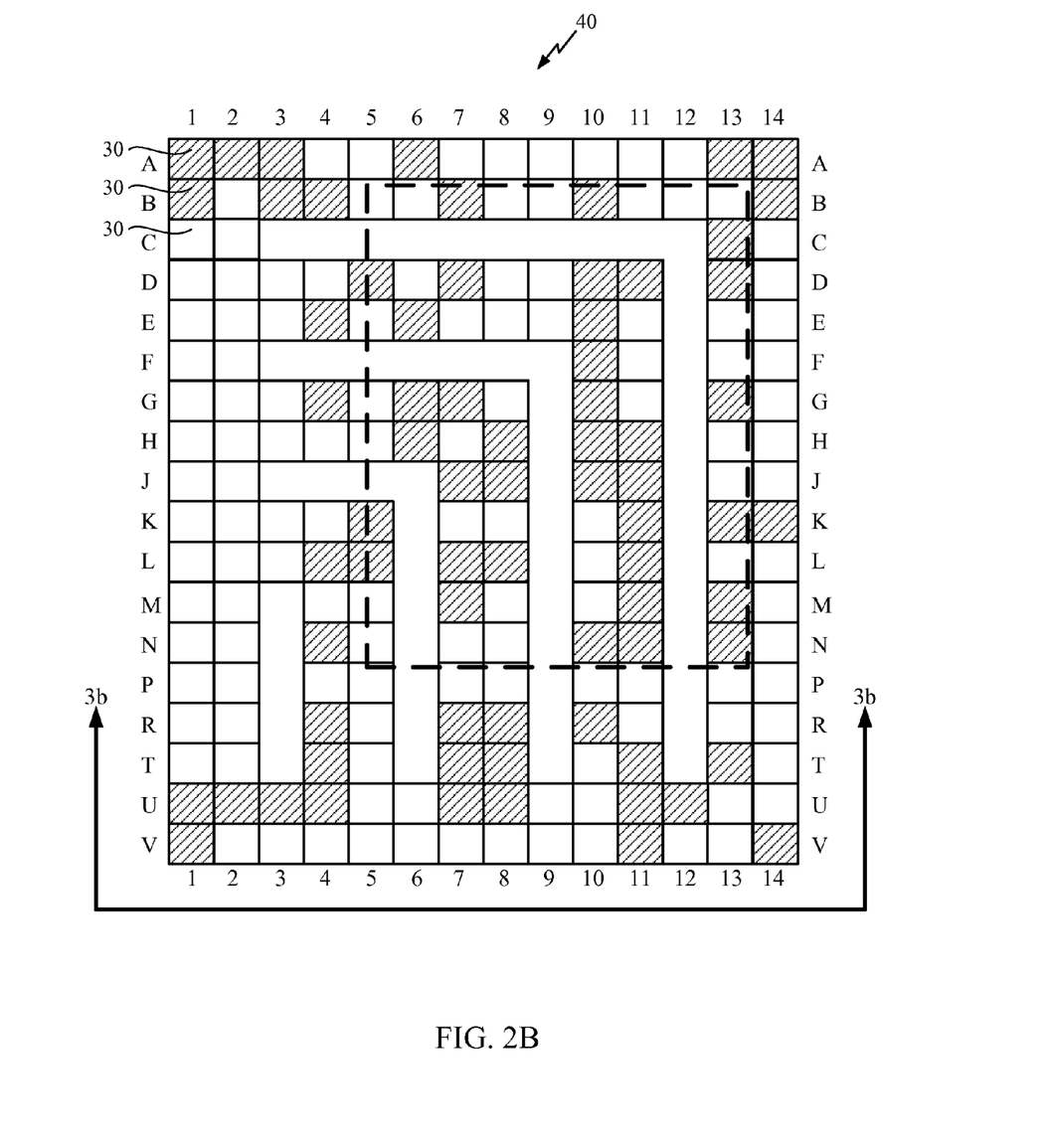

The method described above can be further appreciated from the complete integrated circuit package 20 and integrated circuit product 22 shown in FIGS. 2a, 2b, 3a, and 3b, to which reference is now additionally made. FIG. 2a is a cut-away top view of an illustrative complete integrated circuit package 20 containing a number of integrated circuits 22, 24, and 26 from which a plurality of integrated circuit products can be formed. In the drawings of FIGS. 2a and 2b, only the footprint of the integrated circuits 22, 24, and 26 are shown to illustrate the respective placements of the integrated circuits for this example, the integrated circuit contacts best being seen in FIGS. 3a and 3b.

Figure 3A:
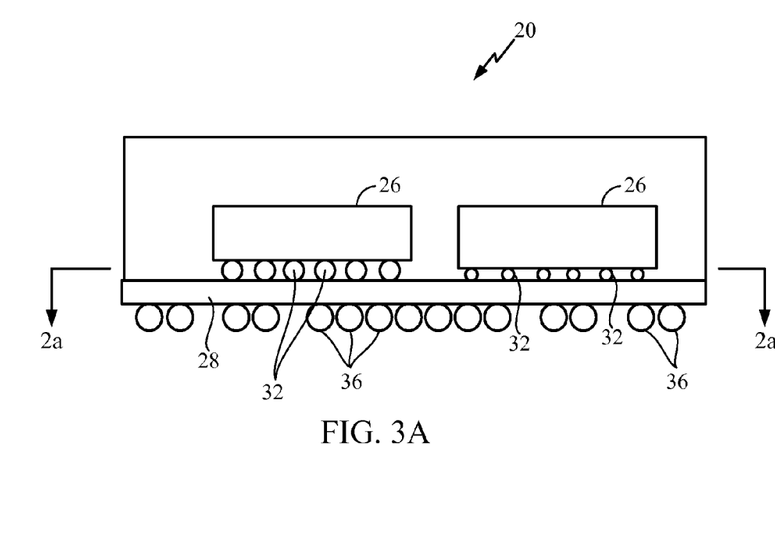

As shown in FIGS. 2a and 3a, the complete integrated circuit package 20 includes a substrate 28 onto which integrated circuits 22, 24, and 26 are carried. The substrate 28 includes a number of contact points 30 which connect to the contacts 32 of the integrated circuits 22, 24, and 26 (see FIG. 3b). In the embodiment illustrated, the integrated circuits 22, 24, and 26 are pre-packaged chips having contacts 32 by which electrical connection to the encapsulated integrated circuit chips may be made. It should be noted however that the particular embodiment of the integrated circuit chips with which the method described herein can be practiced can be of any construction consistent with the end package configuration to be achieved.

Figure 6A:
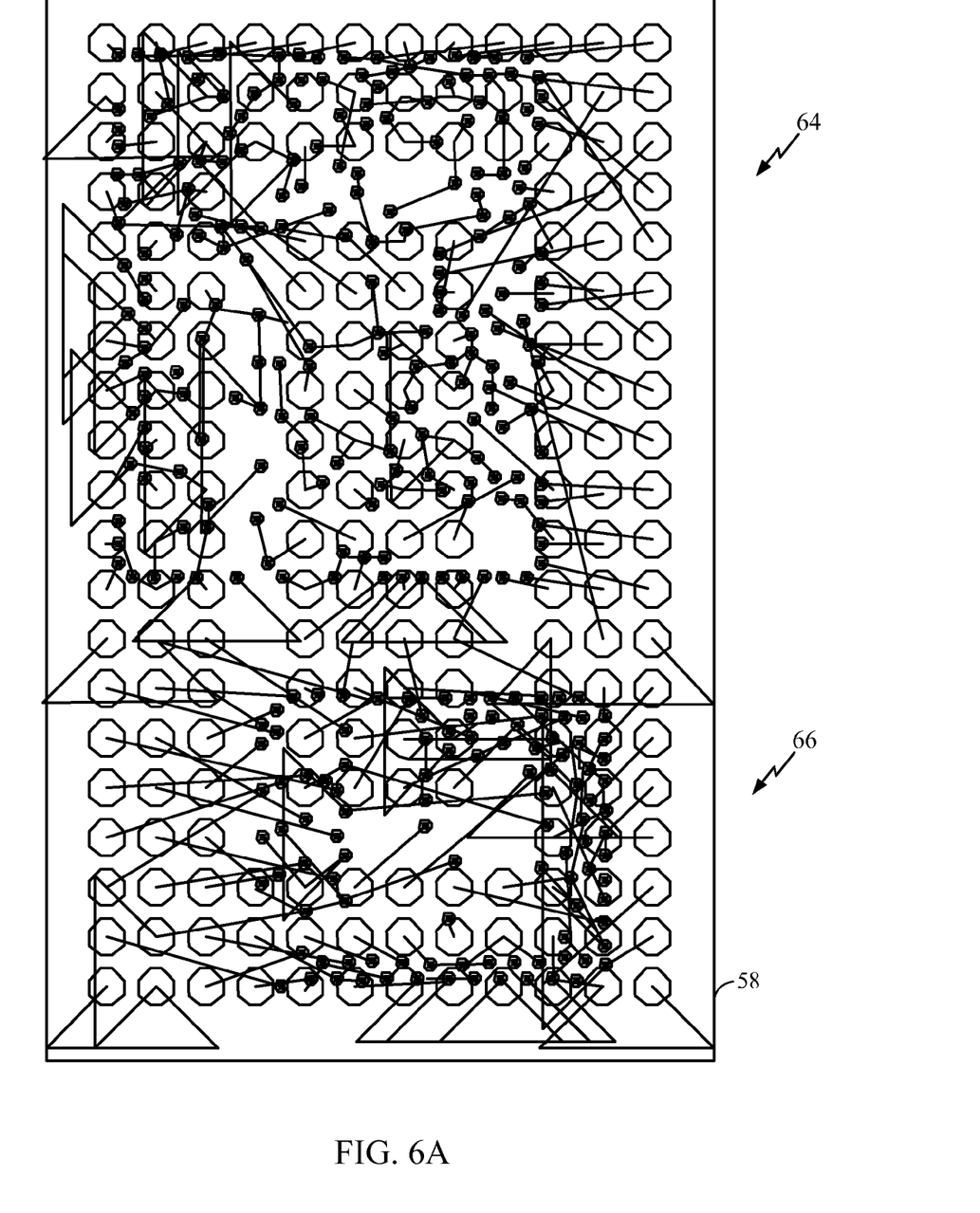
FIG. 6a is a cut-away top view of the integrated circuit package of FIG. 4a, taken at 6a-6a in FIG. 5a, showing an illustration of the package interconnects of the complete integrated circuit package.
Figure 6B:
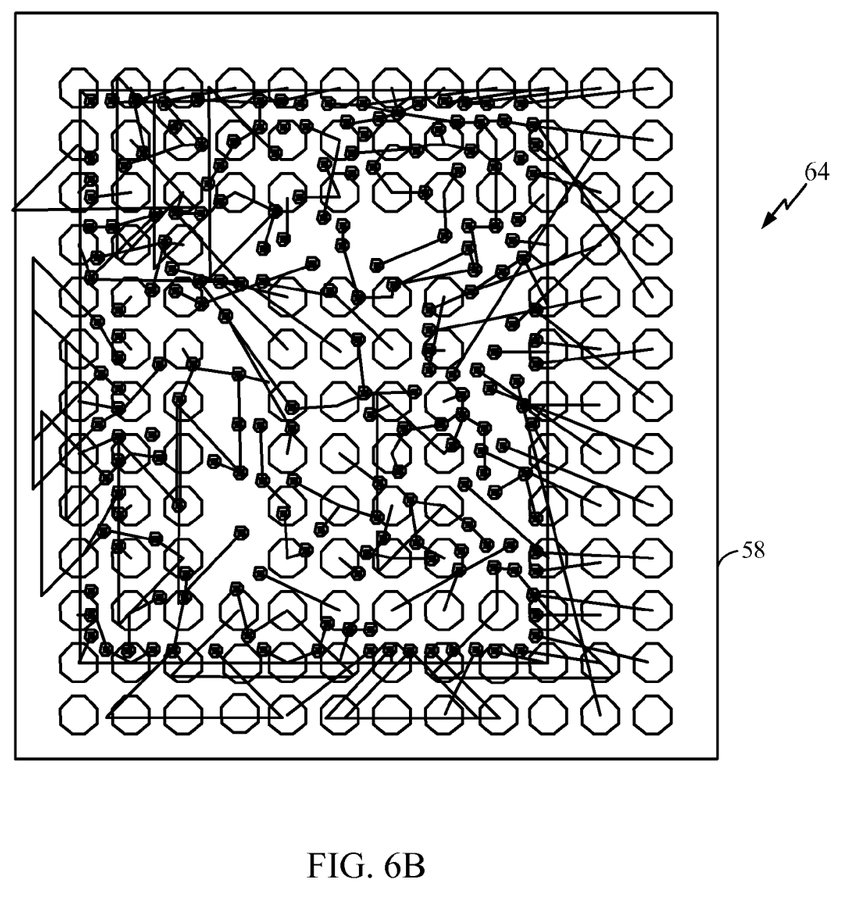
FIG. 6b is a cut-away top view of the integrated circuit product of FIG. 4b, taken at 6b-6b in FIG. 5b, showing an illustration of the package interconnects of the integrated circuit product.

The substrate 28 includes a number of integrated circuit connection sets (not shown), of the type described below in the embodiment shown in FIG. 6, which interconnect the connections 32 of the integrated circuit 22, 24, and 26 to respective contacts 36 on the backside of the substrate 28. The integrated circuit connection sets are fabricated to interconnect a selected integrated circuit to the corresponding connections 36 of the substrate 28. Furthermore, each of the selected integrated circuits that may be connected to its corresponding integrated circuit connection set may be of different functionality. Thus, for example, in the embodiment of FIGS. 2a and 3a, the complete integrated circuit package 20 may provide complete functionality for a mobile phone modem, with the integrated circuit 24 providing, for example, functionality for an audio section, integrated circuit 26 providing functionality of a digital section, and integrated circuit 22 providing functionality for an rf section.

Once the complete integrated circuit package is designed, for example, using computer aided design tools, it may be tested to the extent necessary to determine that it operates properly, and may serve as its own integrated circuit product. However, if a customer desires an integrated circuit product that has the functionality of only a subset of the complete integrated circuit package, it can easily be designed, for example, by using the computer aided design tools to cut the complete integrated circuit package to include only the integrated circuit chip, or chips, having the desired functionality, and its, or their, supporting integrated circuit connection set.

Figure 3B:
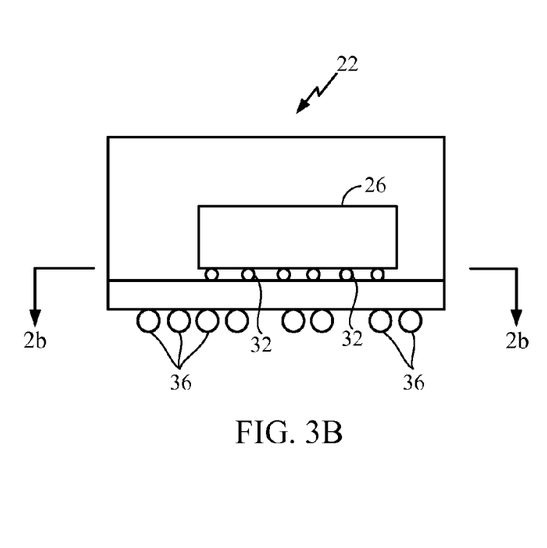
FIG. 3b is a side view of the integrated circuit product taken at 3b-3b in FIG. 2b.

Thus, an integrated circuit package such as the integrated circuit product 40 can be cut from the complete integrated circuit package 20 during a computer aided design process. Subsequently, the integrated circuit package 22 may be connected to the corresponding integrated circuit connection set to complete the integrated circuit product 40, as shown in FIGS. 2b and 3b. The integrated circuit product 40 may be, for example, an integrated circuit product having the functionality of an rf section which is useable by a customer by itself. Since the integrated circuit product 40 was previously tested during the design and test of the complete integrated circuit package 20, only minimal testing need be performed. It should be noted that although the fabrication of the integrated circuit product 40 is shown and described, integrated circuit products can also be formed of the individual integrated circuits 24, 26, or any combination thereof.

Another embodiment of a complete integrated circuit package 50 and subset product 52 is shown in FIGS. 4a, 4b, 5a, 5b, 6a, and 6b, to which reference is now additionally made. In the embodiment 50, two integrated circuits 54 and 56 are designed and fabricated in the complete integrated circuit package. The complete integrated circuit package 50 includes a substrate 58 having various connection points 60 to which the integrated circuit packages 54 and 56 are connected, in known manner.

The substrate 58 has a number of integrated circuit connection sets to which the contacts 62 of the integrated circuits packages 54 and 56 are connected. The integrated circuit connection sets may be fabricated as a metallization layer or pattern, shown, for example in FIGS. 6a and 6b. Thus, as shown, the integrated circuit connection set 64 may correspond to the connections required of a selected integrated circuit package, such as the integrated circuit package 54, and the integrated circuit connection set 66 may correspond to the connections required of a selected integrated circuit package, such as the integrated circuit package 56. The integrated circuit connection sets 64 and 66 serve to connect the contacts 62 of the integrated circuit packages 54 and 56 to the appropriate connections 70 on the bottom side of the substrate 58. Since the complete integrated circuit package may be selectively cut to form individual integrated circuit products, the layout of the integrated circuit connection sets may be designed so that such selective cutting can be employed without damaging the functionality of the cut integrated circuit products.

Once the complete integrated circuit package 50 is designed, for example, using computer aided design tools, it may be tested to the extent necessary to determine that it operates properly, and may serve as its own integrated circuit product. However, if a customer desires an integrated circuit product that has the functionality of only a subset of the complete integrated circuit package, it can easily be designed, for example, by using the computer aided design tools to cut the complete integrated circuit package to include only the integrated circuit chip, or chips, having the desired functionality, and its, or their, supporting integrated circuit connection set.

Figure 4A:
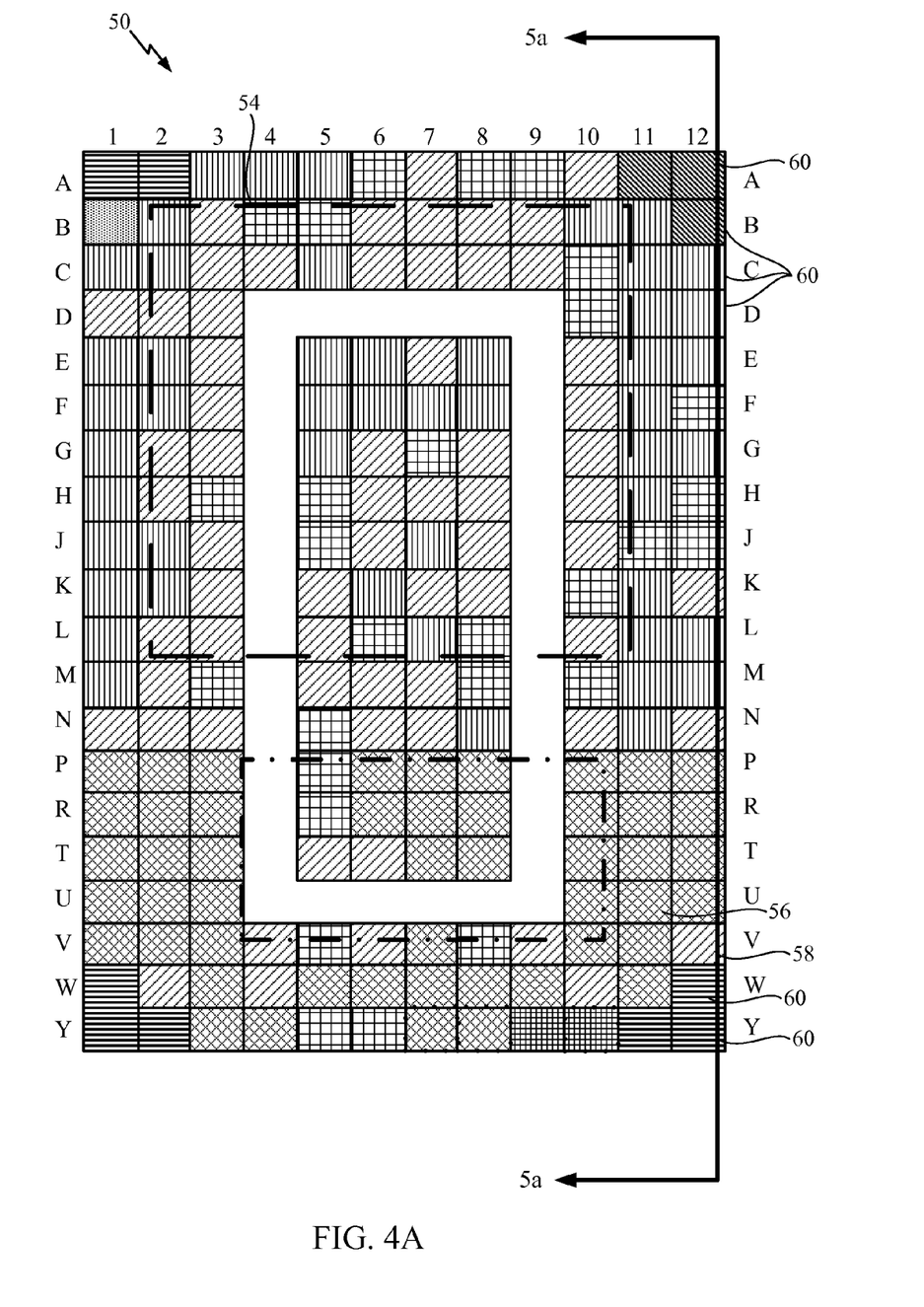
FIG. 4a is a cut-away top view, taken at 4a-4a in FIG. 5a, of an illustrative another complete integrated circuit package containing a number of integrated circuits from which a plurality of integrated circuit products can be formed.
Figure 4B:
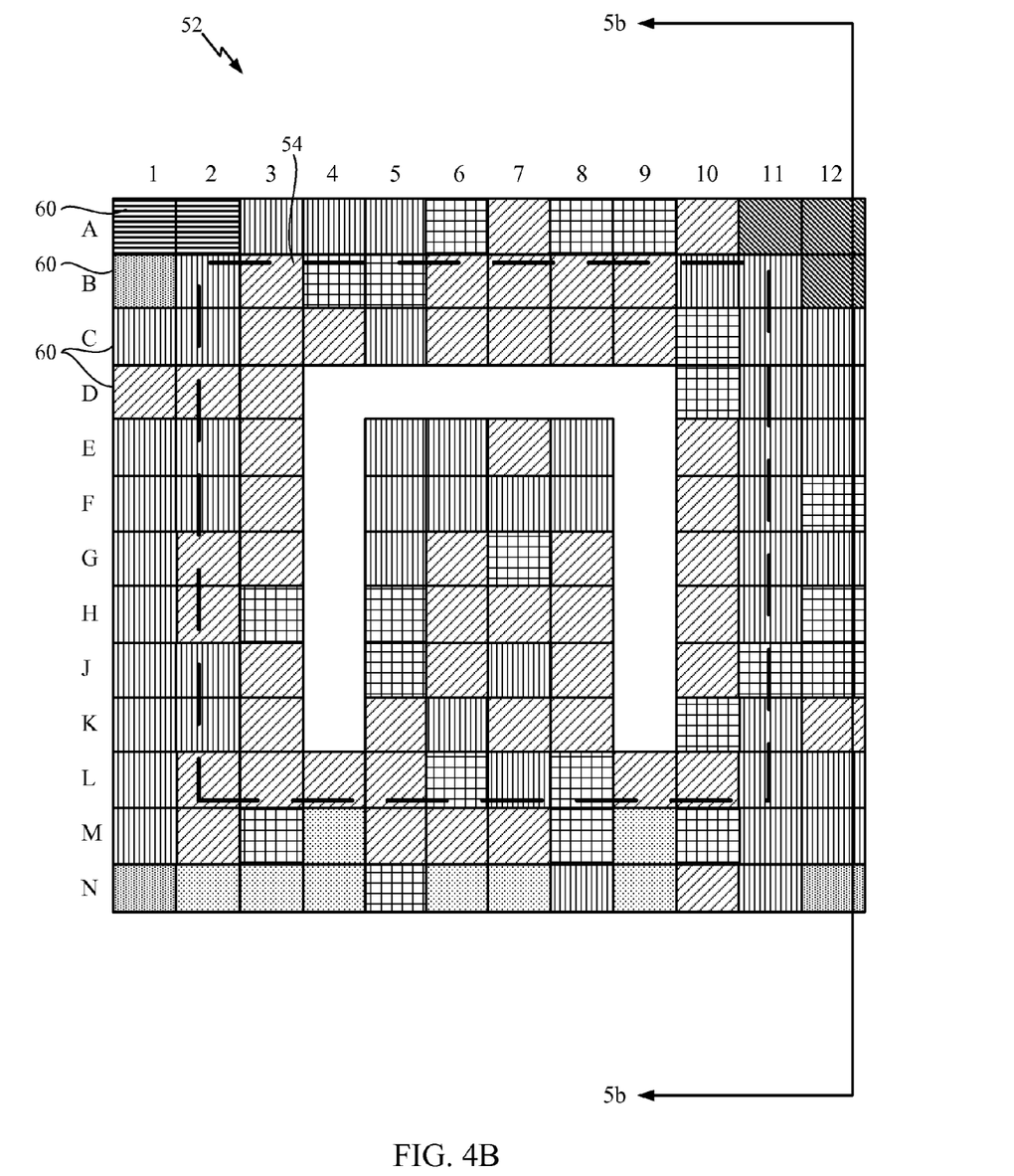
Figure 5A:
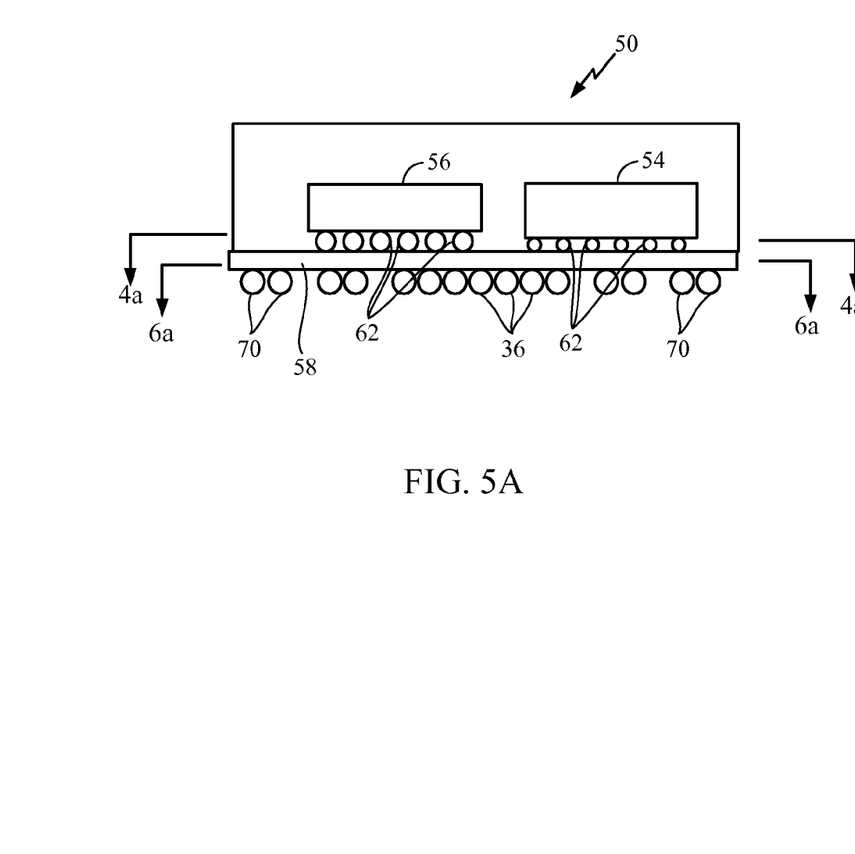
Figure 5B:
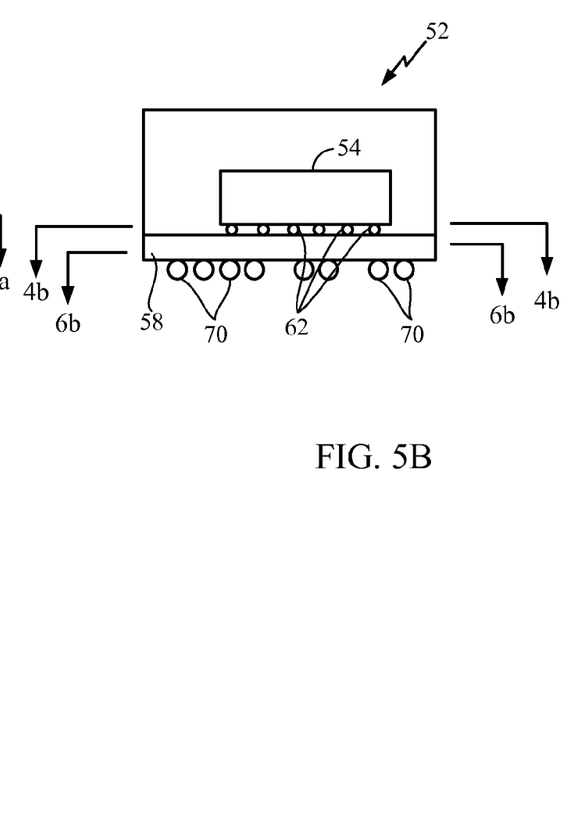
FIG. 5b is a side view of the integrated circuit product taken at 5b-5b in FIG. 4b.

Thus, an integrated circuit package such as the integrated circuit product 52 can be cut from the complete integrated circuit package 50 during a computer aided design process. Subsequently, the integrated circuit package 54 may be connected to the corresponding integrated circuit connection set to complete the integrated circuit product 52, as shown in FIGS. 4b and 5b. Since the integrated circuit product 52 was previously tested during the design and test of the complete integrated circuit package 50, only minimal testing need be performed. It should be noted that although the fabrication of the integrated circuit product 52 is shown and described, integrated circuit products can also be formed of the individual integrated circuit 56.

In view of the above, it will be appreciated that the technique described above can reduce the development cycle and can guarantee the performance of a reused integrated circuit chip in any package design. That is, an ideal situation is to be able to reuse the integrated circuit, package design, and routing that is originally developed and to apply to multiple products without increasing the development cycle time and resources, while guaranteeing the performance in any package.

At least some of the benefits that can be realized using this technique are that only one IC design is needed, only one package design is needed, and only one electrical simulation is needed to verify the electrical performance on multiple products using the same package.

In a particular embodiment, an integrated circuit of the type described herein may be advantageously employed in a wireless communication system. A wireless communication system may include remote units and base stations. Typical wireless communication systems, of course, may have many remote units and base stations. Any of the remote units, as well as the base stations, may include an integrated circuit of the type described herein.

Forward link signals may be sent from the base stations to the remote units and reverse link signals may be sent from the remote units to the base stations.

In a particular embodiment, a first remote unit is a mobile telephone, a second remote unit is a portable computer, and a third remote unit is a fixed location remote unit in a wireless local loop system, for example, in a house or other structure. The remote units, for instance, may also be cell phones, hand-held personal communication systems (PCS) units, portable data units such as personal data assistants, or fixed location data units such as meter reading equipment. Although this specification describes certain exemplary remote units that may include an integrated circuit of the type described herein, the integrated circuit is not limited to these exemplary remote units. One or more integrated circuits of the type described herein may be suitably employed in any electronic device. For example, the electronic device may also be a set top box, a music player, a video player, an entertainment unit, a navigation device, a computer, a portable data unit, or a fixed location data unit. Other suitable electronic devices are manifold.

The words "example" or "exemplary" are used herein to mean "serving as an instance, illustration, nature, or character of the rest." Any embodiment described herein as "an example" or "exemplary" is not necessarily to be construed as preferred or advantageous over other embodiments.

Although embodiments of the invention have been described and illustrated with a certain degree of particularity, it should be understood that the present disclosure has been made by way of example only, and that numerous changes in the combination and arrangement of parts may be resorted to without departing from the spirit and scope of the invention, as hereinafter claimed.

The invention claimed is:

1. An apparatus comprising an integrated circuit (IC) product, the IC product comprising:
   a first IC chip having first IC chip contacts;
   a second IC chip having second IC chip contacts; and
   a substrate, wherein the substrate comprises:
      a plurality of substrate contacts;
      a first set of IC interconnects, wherein the first set of IC interconnects couple the first IC chip contacts to a first set of the plurality of substrate contacts; and
      a second set of IC interconnects, wherein the second set of IC interconnects couple the second IC chip contacts to a second set of the plurality of substrate contacts;
   wherein the first IC chip corresponds to a first IC design that is removable from the IC product during a design phase of the IC product without impacting functionality of the second IC chip, wherein the second IC chip corresponds to a second IC design that is removable from the IC product during the design phase of the IC product without impacting functionality of the first IC chip, and
   wherein at least one substrate contact is within the first set of the plurality of substrate contacts and the second set of the plurality of substrate contacts.

2. The apparatus of claim 1, wherein the first set of IC interconnects and the second set of IC interconnects are metallization patterns on the substrate.

3. The apparatus of claim 1, wherein the first IC chip provides different functionality than the second IC chip.

4. The apparatus of claim 1, further comprising at least one of a mobile phone, a set top box, a music player, a video player, an entertainment unit, a navigation device, a computer, a hand-held personal communication systems (PCS) unit, a portable data unit, or a fixed location data unit, into which the IC product is integrated.

5. The apparatus of claim 1, further comprising a plurality of IC chips, wherein the plurality of IC chips comprises the first IC chip, the second IC chip, and at least one additional IC chip.

6. The apparatus of claim 1, further comprising an electronic device, wherein the IC product is integrated into the electronic device and is configured to support functionality of an audio section of the electronic device, a video section of the electronic device, a radio frequency section of the electronic device, or a combination thereof.

7. The apparatus of claim 1, wherein the first set of IC interconnects are distinct from the second set of IC interconnects.

8. The apparatus of claim 1, wherein the first set of the plurality of substrate contacts comprises multiple substrate contacts.

9. The apparatus of claim 1, wherein the plurality of substrate contacts are configured in a grid array pattern, and wherein the grid array pattern includes multiple rows and multiple columns.

10. The apparatus of claim 1, wherein the first set of IC interconnects and the second set of IC interconnects enable the first IC chip to operate in conjunction with the second IC chip.

11. The apparatus of claim 1, wherein the first IC chip provides first functionality, and wherein the second IC chip provides second functionality that is different from the first functionality.

12. The apparatus of claim 11, wherein the first functionality is provided via the first set of the plurality of substrate contacts such that, upon removal of the second IC chip from the substrate, the first IC chip is configured to continue to provide the first functionality via the first set of the plurality of substrate contacts.

13. The apparatus of claim 1, wherein a first design of the first set of interconnects and the second set of interconnects enables a second design of a first IC to be produced that includes the first IC chip but not the second IC chip.

14. The apparatus of claim 1, wherein computer aided design tools construct a design of the substrate including the first set of IC interconnects and the second set of IC interconnects.

15. The apparatus of claim 1, further comprising:
   a third IC chip having third IC chip contacts;
   wherein the substrate further comprises a third set of IC interconnects within the substrate, wherein the third set of IC interconnects couple the third IC chip contacts to a third set of the plurality of substrate contacts.

16. The apparatus of claim 15, wherein the first IC chip provides audio functionality for a mobile phone modem, wherein the second IC chip provides digital functionality for the mobile phone modem, and wherein the third IC chip provides radio frequency (RF) functionality for the mobile phone modem.

17. The apparatus of claim 1, wherein the first IC chip contacts are coupled to a front side of the substrate, wherein the second IC chip contacts are coupled to the front side of the substrate, and wherein the plurality of substrate contacts are positioned on a backside of the substrate.

18. The apparatus of claim 1, wherein the first IC chip contacts are positioned on a first surface of the substrate, and wherein the second IC chip contacts are positioned on the first surface of the substrate.

19. The apparatus of claim 1, wherein the first IC chip is positioned next to the second IC chip, and wherein the plurality of substrate contacts are positioned on a second surface of the substrate.

20. An apparatus comprising an integrated circuit (IC) product, the IC product comprising:
   first means for performing IC functions, the first means for performing IC functions comprising first IC chip contacts;
   second means for performing IC functions, the second means for performing IC functions comprising second IC chip contacts; and
   a substrate, wherein the substrate comprises:
      a plurality of substrate contacts;
      a first plurality of means for connecting layers, wherein the first plurality of means for connecting layers is carried by the substrate and couples the first IC chip contacts to a first set of the plurality of substrate contacts; and
      a second plurality of means for connecting layers, wherein the second plurality of means for connecting layers is carried by the substrate and couples the second IC chip contacts to a second set of the plurality of substrate contacts;
   wherein the first means for performing IC functions corresponds to a first IC design that is removable from the IC product during a design phase of the IC product without impacting functionality of the second means for performing IC functions, wherein the second means for performing IC functions corresponds to a second IC design that is removable from the IC product during the design phase of the IC product without impacting functionality of the first means for performing IC functions, and wherein at least one substrate contact is within the first set of the plurality of substrate contacts and the second set of the plurality of substrate contacts.

21. The apparatus of claim 20, wherein the first plurality of means for connecting layers and the second plurality of means for connecting layers include metallization patterns on the substrate.

22. The apparatus of claim 20, wherein the first means for performing IC functions provides different functionality than the second means for performing IC functions.

23. The apparatus of claim 20, further comprising at least one of: a mobile phone, a set top box, a music player, a video player, an entertainment unit, a navigation device, a computer, a hand-held personal communication systems (PCS) unit, a portable data unit, or a fixed location data unit, into which the IC product is integrated.

24. The apparatus of claim 20, further comprising a plurality of means for performing IC functions, wherein the plurality of means for performing IC functions comprises the first means for performing IC functions, the second means for performing IC functions, and at least one additional means for performing IC functions.

25. The apparatus of claim 20, further comprising an electronic device, wherein the first means for performing IC functions, the second means for performing IC functions, and the substrate are integrated into the electronic device and are configured to support functionality of an audio section of the electronic device, a video section of the electronic device, a radio frequency section of the electronic device, or a combination thereof.

26. The apparatus of claim 20, wherein the first means for performing IC functions comprises a first IC chip, and wherein the second means for performing IC functions comprises a second IC chip.

27. The apparatus of claim 20, wherein the first plurality of means for connecting layers comprises a first set of IC interconnects, and wherein the second plurality of means for connecting layers comprises a second set of IC interconnects.

* * * * *